United States Patent [19]

Osama et al.

[11] Patent Number: 6,034,456
[45] Date of Patent: Mar. 7, 2000

[54] COMPACT BEARINGLESS MACHINE DRIVE SYSTEM

[75] Inventors: Mohamed Osama; Neil Richard Garrigan, both of Niskayuna, N.Y.; Wen Liang Soong, Malvern, Australia

[73] Assignee: General Electric Company, Schenectady, N.Y.

[21] Appl. No.: 09/176,598

[22] Filed: Oct. 21, 1998

[51] Int. Cl.[7] .............. H02K 7/09; H02K 7/20; H02K 16/00
[52] U.S. Cl. .............. 310/90.5; 310/112; 310/114
[58] Field of Search .............. 310/90.5, 114, 310/89, 91, 65, 125, 124, 126, 112, 166, 211, 113, 212, 213; 219/648, 647

[56] References Cited

U.S. PATENT DOCUMENTS

| | | | |
|---|---|---|---|
| 4,841,204 | 6/1989 | Studer | 318/254 |
| 5,424,595 | 6/1995 | Preston et al. | 310/90.5 |
| 5,703,423 | 12/1997 | Fukao et al. | 310/90.5 |
| 5,708,346 | 1/1998 | Schob | 318/803 |
| 5,729,066 | 3/1998 | Soong et al. | 310/90.5 |

FOREIGN PATENT DOCUMENTS

| | | |
|---|---|---|
| 0726638 A2 | 2/1995 | European Pat. Off. . |
| 0768750 A1 | 3/1996 | European Pat. Off. . |
| 0739078 A2 | 4/1996 | European Pat. Off. . |
| WO 97/07340 | 2/1997 | Germany . |
| 8275595 | 10/1996 | Japan . |

OTHER PUBLICATIONS

F. Matsumura, et al, Theory and Experiment of Magnetic Bearing Combining Radial Control and Thrust Control, IEEE Trans on Magnetics, vol. MAG–23, No. 5, Sep. 1987, pp. 2581–2583.

A. Chiba, et al., "Stable Operation of Induction–Type Bearingless Motors Under Loaded Conditions", IEEE Trans. On Industry Applications, vol. 33, No. 4, Jul./Aug. 1997, pp. 919–924.

A. Chiba, et al, "An Analysis of Bearingless AC Motors", IEEE Trans on Energy conversion, vol. 9, No. Mar. 1994, pp. 61–67.

C. Michioka, et al., "A Decoupling Control Method of Reluctance–Type Bearingless Motors Considering Magnetic Saturation", IEEE Trans. On Industry Applications, vol. 32, No. 5, Sep./Oct. 1996, pp. 1204–1210.

Y. Okada, "Levitation and Torque Control of Internal Permanent Magnet Type Bearingless Motor", IEEE Trans on Control Systems Technology, vol. 4., No. 5, Sep. 1996, pp. 565–571.

RT. Schob, et al, "Vector Control of the Bearingless Motor", Fourth International Symposium on Magnetic Bearings, Aug. 1994, ETH Zurich, pp. 327–332.

A. L. Jokl, Ph. D., Theory and Design of Synchrounous Machines, p. 2, 1993.

*Primary Examiner*—Elvin Enad
*Assistant Examiner*—Dane Dinh Le
*Attorney, Agent, or Firm*—Ann M. Agosti; Jill M. Breedlove

[57] ABSTRACT

A compact bearingless machine drive system includes: a first rotor segment; a first stator segment with the first stator segment including a drive winding and a first control winding; a second rotor segment; a second stator segment with the second stator segment including the drive winding and a second control winding; and a rotor shaft. The first and second rotor segments are attached to the rotor shaft. A common end ring is coupled between the first and second rotor segments. A drive inverter controls the drive winding to generate torque, and first and second control inverters control the first and second control windings to generate radial forces on the first and second rotor segments.

16 Claims, 6 Drawing Sheets

COMPACT BEARINGLESS MACHINE DRIVE SYSTEM

BACKGROUND OF THE INVENTION

The present invention relates to bearingless machine drives.

Conventional magnetic bearing motor drive systems include a five axis magnetic bearing system and a motor drive. In these embodiments, the motor drive, two radial bearings, and an axial bearing are situated on a common shaft with the two radial bearings being positioned on opposite sides of the motor drive. A separate inverter is needed for each bearing and the motor drive.

Bearingless motors combine the function of an electric motor to generate torque with the function of a magnetic bearing to generate radial forces. The torque and radial forces are generated by adding a control winding to the motor with a pole number which differs from the main motor winding (the drive winding) by two poles.

The interaction of the two air-gap fields differing by one pole pair results in a net radial force acting on the rotor. Controllable radial forces can then be produced by appropriately controlling the current of the control winding. Such control techniques are discussed, for example, in Schob, U.S. Pat. No. 5,708,346, and Fukao et al., EP Patent Application No. 739 078.

A typical five-axis bearingless motor system performing the same function as a magnetic bearing system includes two motors with the rotors joined together on a common shaft. Each motor generates controllable radial forces and thus permits stable control of the rotor. Because each motor can only produce radial forces in two axes, two motors are required to achieve stable levitation. End windings of the stators and end rings of the rotors often require a space which creates a large separation between the two motors.

SUMMARY OF THE INVENTION

It is therefore seen to be desirable to provide a more compact bearingless machine drive assembly with simplified fabrication techniques.

Briefly, according to one embodiment of the present invention, a compact bearingless machine drive system comprises a first rotor segment; a first stator segment, the first stator segment including a drive winding and a first control winding; a second rotor segment; a second stator segment, the second stator segment including the drive winding and a second control winding; a rotor shaft, the first and second rotor segments being attached to the rotor shaft; a common end ring coupled between the first and second rotor segments; a drive inverter for controlling the drive winding; and first and second control inverters for respectively controlling the first and second control windings.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

The present invention can be used in machines acting either as motors or generators.

Figure 1:
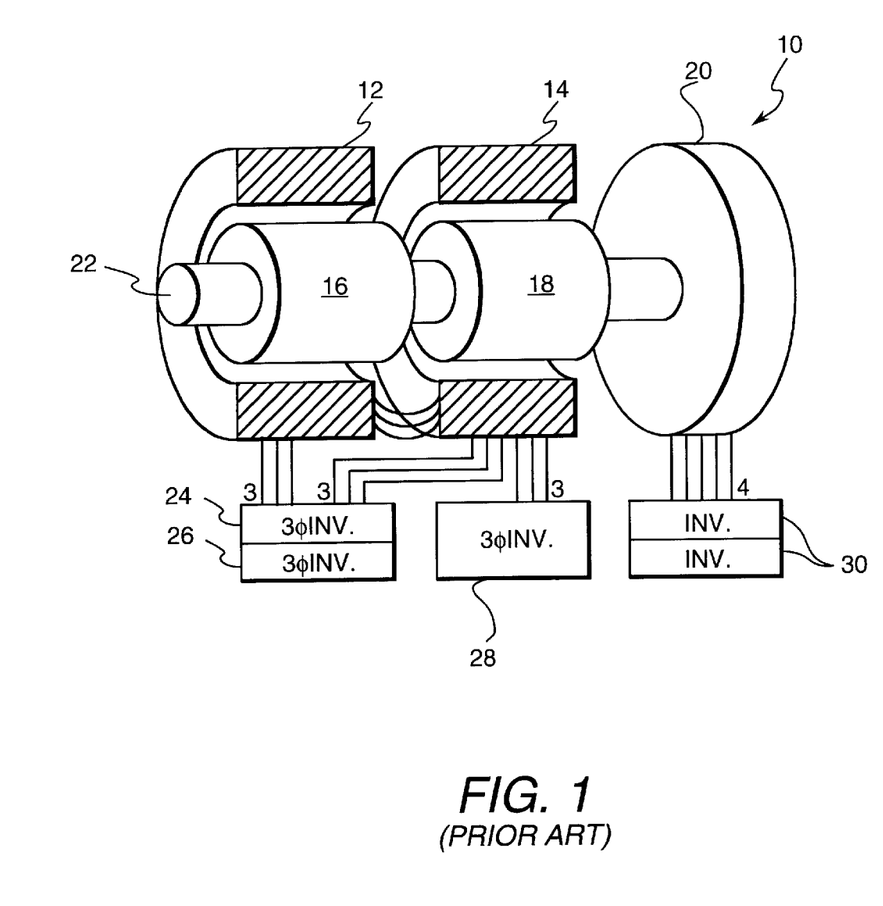
FIG. 1 is a perspective view of a prior art bearingless machine drive system.

FIG. 1 is a perspective view of a prior art bearingless motor drive system 10 as shown and described by aforementioned Fukao et al., EP Patent Application No. 739 078. Drive system 10 includes rotors 16 and 18, stators 12 and 14, and three-phase inverters 24, 26, and 28. The torque generating windings of stators 12 and 14 are controlled by inverter 28. The control windings for generating radial magnetic force in stators 12 and 14 are controlled by respective inverters 24 and 26. Inverter 30 controls an axial bearing 20.

Figure 2:
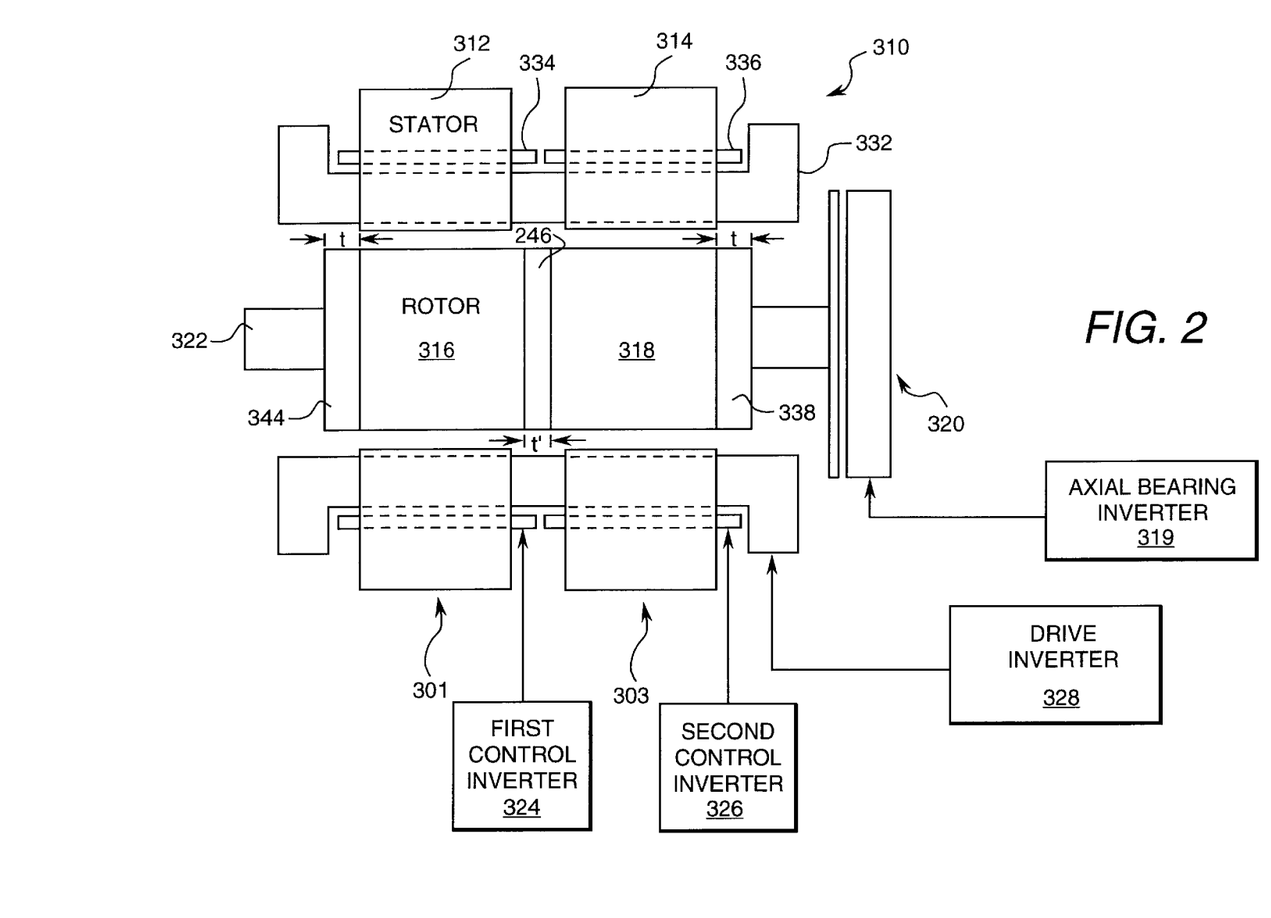
FIG. 2 is a side view of a bearingless machine drive system wherein a common end ring is coupled between the rotor segments.

FIG. 2 is a side view of a bearingless induction drive system 310 of the present invention wherein a first machine segment 301 includes a first rotor segment 316 and a first stator segment 312 with the first stator segment including a drive winding 332 and a first control winding 334. Drive system 310 further comprises a second machine segment 303 including a second rotor segment 318 and a second stator segment 314 which includes drive winding 332 and a second control winding 336. The first and second rotor segments are attached to a rotor shaft 322. A common "end ring" 246 is coupled between the rotor segments. These rotor segments have separate outer end rings 344 and 338. A drive inverter 328 controls the shared drive winding to generate torque, and first and second control inverters 324 and 326 respectively control the first and second control windings to generate radial forces on the first and second rotor segments. An axial bearing 320 is coupled to the rotor shaft, and an axial bearing inverter 319 controls axial forces on the axial bearing.

In the embodiment of FIG. 2, the stator segments and rotor segments typically comprise laminations such as carbon steel or silicon steel laminations but can be solid for some applications. Common end ring 246 and outer end rings 344 and 346 may comprise aluminum or copper, for example. The common end ring primarily carries the small currents associated with the magnetic bearing radial force windings (the control windings) and can thus be thinner than outer end rings 344 and 338. Rotor bar 445 (shown in FIG. 4) currents associated with the main field current (for motoring—the drive winding) flow axially down the rotor segments and through the outer end rings. The common end ring, rotor segments, and outer end rings typically will have rotor bars (not shown) extending therethrough. Preferably the rotor bars extend the length of the combined rotor segments to simplify manufacturing and provide a higher mechanical stiffness than having separate bars for each rotor segment.

Figure 4:
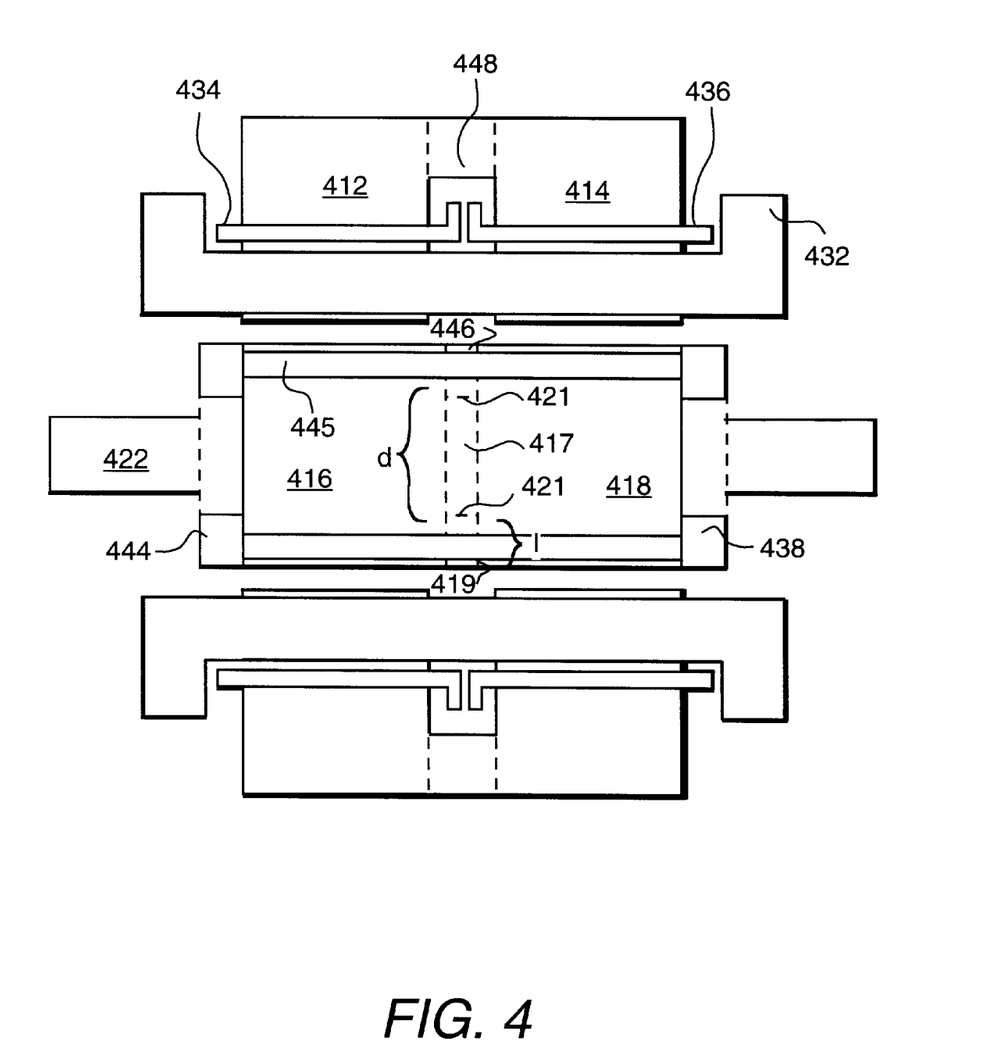
FIG. 4 is a sectional side view of FIG. 3.

In one embodiment, the bars and end rings are cast simultaneously. Typically, in this embodiment, the rotor slots (in which the rotor bars will be formed) are closed, and the casting material is aluminum. In this embodiment, as shown in FIG. 4, it is useful for the laminations of one or both of the rotor segments to have a smaller diameter (d) in the area 417 around which the end ring will be cast. In this embodiment, if desired, a single stack of rotor laminations can be used through the length of the rotor segments. In one embodiment, the same laminations are used for area 417 as for rotor segments 416 and 418 with the rotor teeth (which define the rotor slots) being removed. The material of area 417 may be flush with the rotor bars as shown, or may extend to lines 421 to adjust the common end ring length (l). A retainer ring (not shown) on the surface 419 outside the common end ring can be used during casting to prevent molten aluminum from flowing outside.

If lower circuit resistance is desired, copper bars and end rings can be used.

The higher melting temperature of copper causes casting to be more difficult, so the bars and end rings are typically prefabricated and brazed to each other after being positioned in and around the rotor segments. Prefabricated rotor bars and end rings are also useful in the event that open rotor slots are present.

Figure 3:
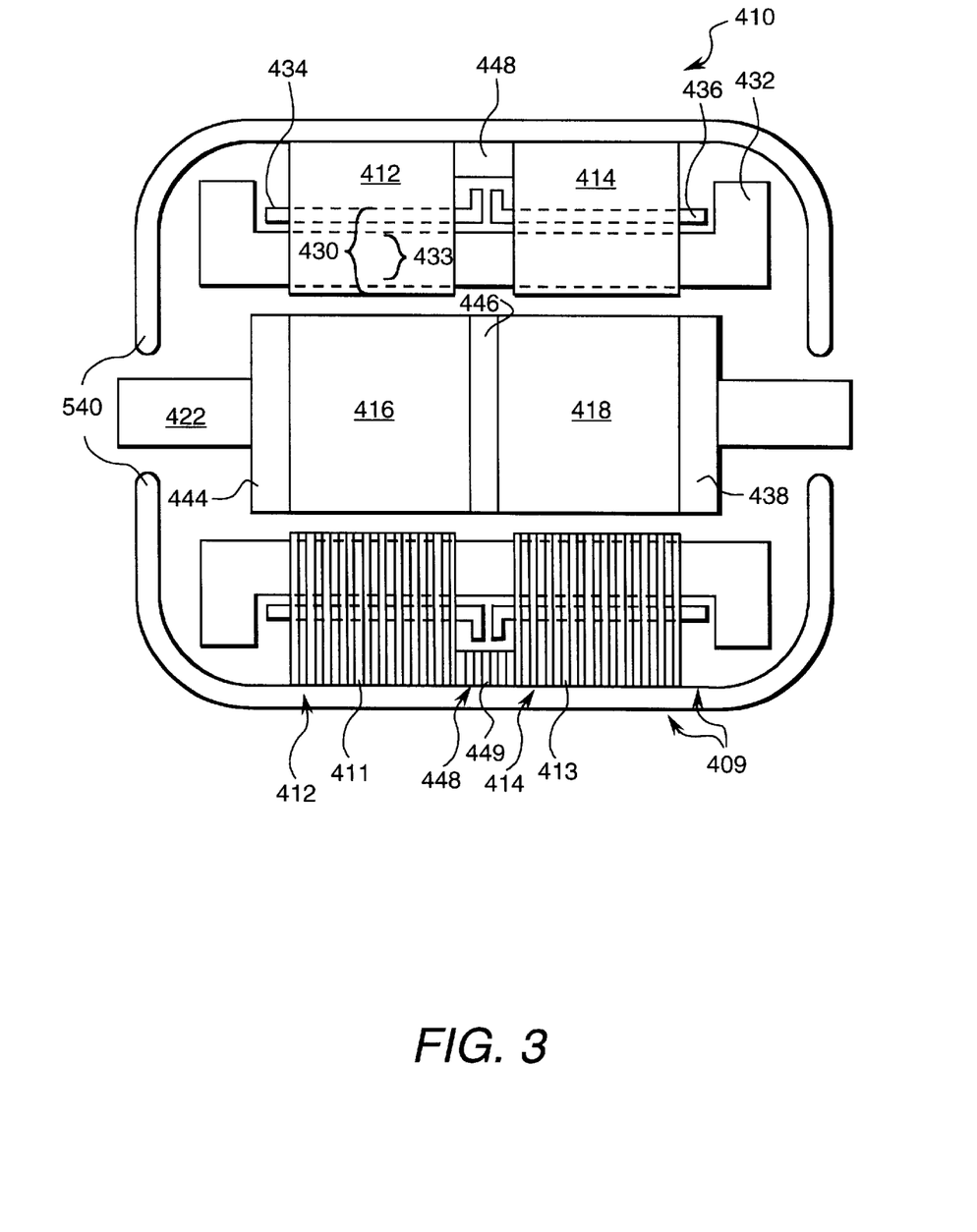
FIG. 3 is a side view of a bearingless machine drive system wherein a spacer is coupled between the stator segments.

In one embodiment outer end rings 344 and 338 have conventional end ring thicknesses t which typically range from about five mm for a machine with one horsepower to about 100 mm for a machine with thousands of horsepower. Common end ring 246 thickness t' need only be a fraction of the outer end ring thickness with this fraction decreasing as the machine size increases (because the ratio between control winding currents and drive winding currents is expected to decrease as the size of the motor increases). For example, the thickness can be about 20% (1 mm) of an outer ring thickness of 5 mm for a one horsepower machine and about 5% (5 mm) of an outer ring thickness of 100 mm for a 1000 horsepower machine. Thus the common end ring typically has either a thickness ranging from about 5% to about 20% of the thickness of an outer end ring or a thickness ranging from about 1 mm to about 5 mm. Because the common end ring is shared by the rotor segments, the axial length of the drive system can be reduced, and the rotor combination can become more mechanically stiff.

FIG. 3 is a side view and FIG. 4 is a sectional side view of a bearingless machine drive system 410 wherein stator segments 412 and 414 are situated with a spacer 448 coupled therebetween which provides additional mechanical stiffness to the drive assembly. The spacer may comprise either a magnetic or a non-magnetic material.

As compared with a non-magnetic spacer, a magnetic spacer has an advantage of increasing the total stator segment flux by a small amount and a disadvantage that the magnetic material leads to larger stator end winding leakage flux for the control winding. If the spacer is magnetic, then the material will typically be the same material as the stator segments and will typically be laminated.

If the spacer material is nonmagnetic, then it will typically be a solid (non-laminated) low conductivity material to prevent eddy currents. The non-magnetic material can be either metallic or non-metallic with a similar heat expansion coefficient as the stator segments such that the combined stator segment/spacer assembly functions mechanically as a single unit and does not become deformed as the stator segment temperature rises (when the motor becomes fully loaded). Generally the material is selected so that its tensile strength is at least the same as that of the stator segments.

In one embodiment, the spacer has an outer diameter substantially equal to the outer diameter of the stator segments and an inner diameter greater than the inner diameter of the stator segments. Thickness of the spacer is preferably minimized. The spacer need only be sufficiently thick to permit clearance of control windings 434 and 436.

In one embodiment, stator segment pair 409 is fabricated by stacking laminations 411 of the first stator segment; winding the first stator segment with first control winding 434; stacking laminations 413 of the second stator segment; winding the second stator segment with second control winding 436; stacking spacer laminations 449; positioning the spacer between the first and second stator segments; and winding the first and second stator segments with drive winding 432.

If the spacer has the same outside diameter as the rest of stator segment laminations, the stator segments and spacer can be held together in the same manner as individual stator segment laminations are held together. Usually these laminations are held together by a weld on the outside the stator segment diameter. Additionally, a motor frame 540 which is typically shrunk on the laminations can help hold the stator segments and spacer together.

In many conventional designs, such as shown in FIG. 1, two machines are each enclosed by separate frames (not shown) with the only commonality being the common shaft 22. In the embodiments of FIGS. 3 and 4 of the present invention, the machine drive system functions as a single machine which can be enclosed by a common frame (shown as frame 540 in FIG. 3). The resulting machine has both the appearance and mechanical stiffness of a single machine. The higher mechanical stiffness of this "single" rotor (over the conventional embodiments of two rotors joined by a shaft) is due to shortening of the assembly and enhanced by the optional use of a single stack of laminations through the rotor length. An advantage of higher mechanical stiffness is that mechanical dynamics are simplified which, among other benefits, results in a higher critical rotor speed and permits higher running speeds.

Figure 5:
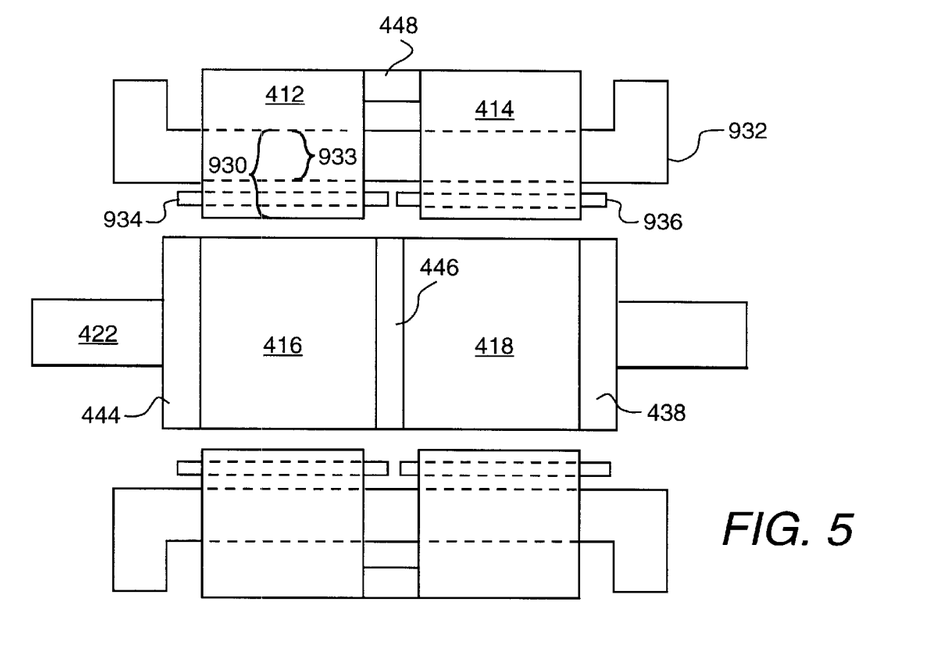
FIG. 5 is a side view similar to that of FIG. 3 illustrating a modified winding arrangement.

FIG. 5 is a side view similar to that of FIG. 3 illustrating a modified winding arrangement wherein control windings 934 and 936 are located between the rotor segments 416 and 418 and drive winding 932. In one method for fabricating this embodiment, for example, the spacer is positioned between the first and second stator segments, the first and second stator segments are wound with the drive winding and the first and second stator segments are then wound with the first and second control windings.

In practice, the control windings can be positioned anywhere within stator slots 930 of FIG. 5 or 430 of FIG. 3. For ease of manufacturing, it is preferable to position the control windings either at either inner positions 933 or outer positions 433 (closer to the rotor segments) of the slots so as not to interfere with winding the drive winding.

If the control windings are located at inner positions 433 as shown in FIGS. 3 and 4, then the control windings can be bent to advantageously minimize spacer axial thickness, but the stator slot leakage inductance for the control windings is larger than that of the FIG. 5 embodiment.

Positioning the control windings in outer portions 933 as shown in FIG. 5, provides a much lower stator slot leakage inductance for the control windings, but in some applications, this configuration might require an increase the spacer thickness due to insufficient space to allow for bending the ends of the control windings. The effect of magnetic spacer on increasing the stator end winding leakage inductance for the control windings is less evident in case of control windings in outer portions 933 of slot 930 than in inner portions 433 of slots 430.

Thus, the location of control windings within the stator slot is dependent on each particular design and is a function of (among other variables): ease of manufacturability, spacer axial thickness, and desired total stator leakage inductance of control windings.

Figure 6:
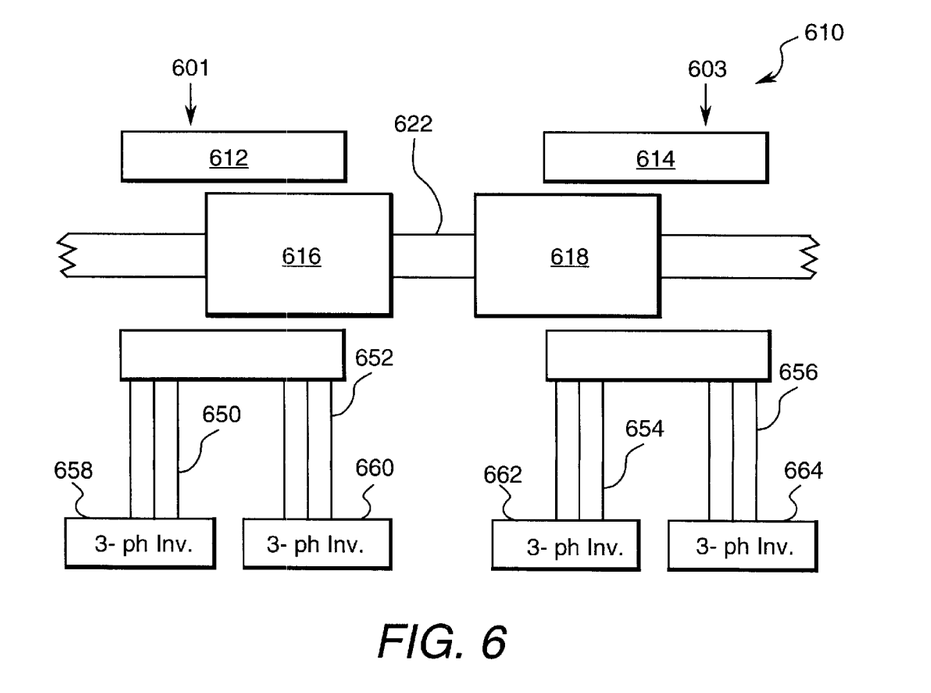
FIG. 6 is a side view of a bearingless machine drive system wherein rotor segments are offset to eliminate the need for a separate axial bearing.

FIG. 6 is a side view of a bearingless machine drive system 610 with axial control wherein rotors 616 and 618 on shaft 622 are offset with respect to stators 612 and 614 to eliminate the need for a separate axial bearing. In this embodiment, the first and second rotors have respective asymmetrical orientations with respect to the first and second stators such that each machine 601 and 603 is capable of creating a bidirectional force in an axial direction when the machine is excited. This embodiment includes two drive inverters 652 and 654 (with associated stator windings 652 and 654) and two control inverters 658 and 664 (with associated stator windings 650 and 656).

Figure 7:
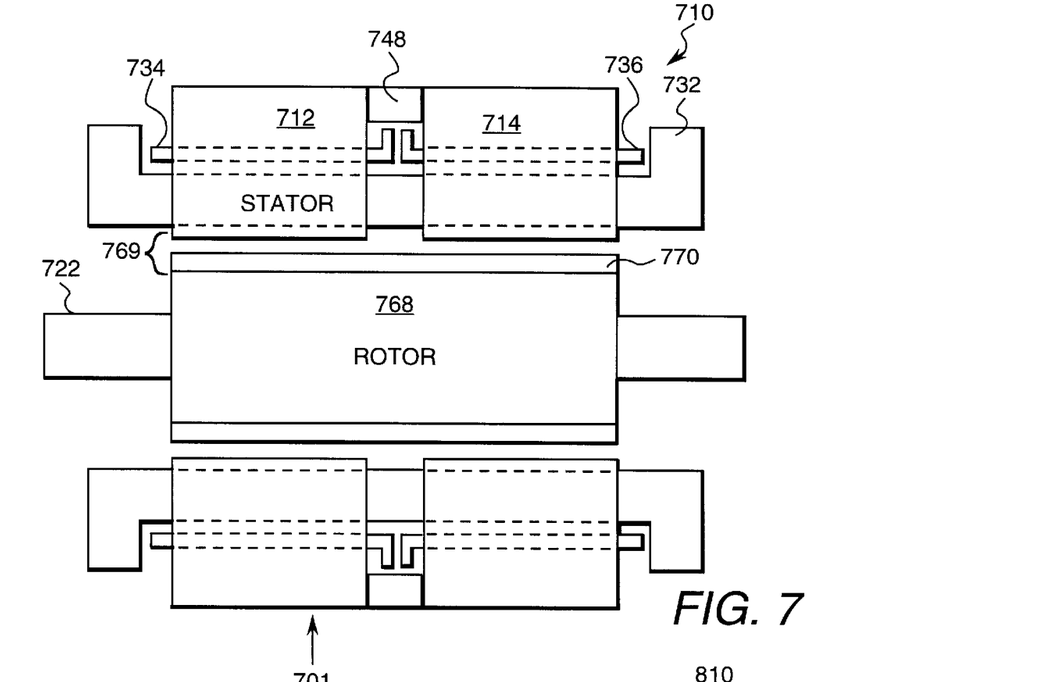
FIG. 7 is a side view of the bearingless machine drive system of the present invention as applied to a permanent magnet machine.
Figure 8:
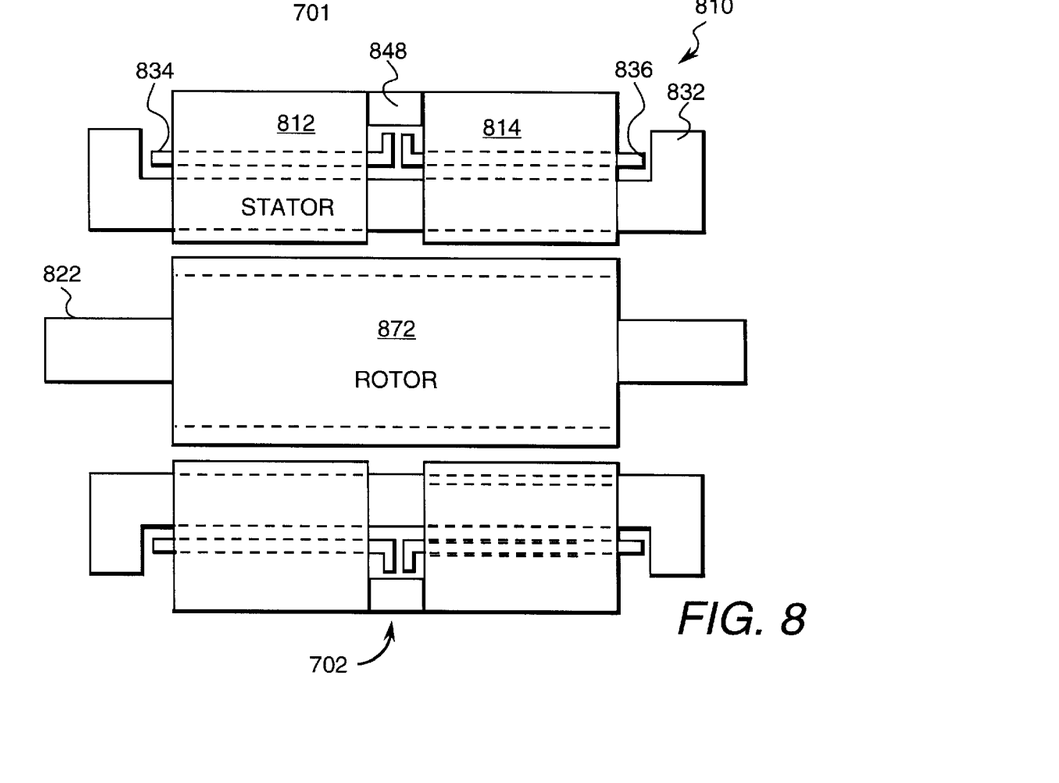
FIG. 8 is a side view of the bearingless machine drive system of the present invention as applied to a syncrhonous reluctance machine.

Although FIGS. 2–6 are described in terms of induction motors, as discussed with respect to FIGS. 7 and 8, some of the described concepts are applicable for other types of motors.

FIG. 7 is a side view of the bearingless machine drive system 710 of the present invention as applied to a permanent magnet machine 701, and FIG. 8 is a side view of the bearingless machine drive system 810 of the present invention as applied to a synchronous reluctance machine 702. In these motors, no currents flow in the rotor, and thus a single rotor can be used because there is no need for a common end ring between two rotor segments. Rotor materials for these machines can be solid or laminated. The single rotor preferably has an axial length corresponding to the combined stator segments 712 and 714 and spacer 748.

In bearingless motors it is desirable to minimize the magnetic reluctance seen by the control winding so as to reduce the control winding ampere-turn requirements to modulate the main magnetic field and hence produce radial force. Synchronous reluctance motors are useful for minimizing this reluctance.

Minimizing reluctance in the permanent magnet machine 701 of FIG. 7 can be more challenging due to the relatively large gap 769 between the rotor 768 and the stator segments 712 and 714 produced by permanent magnet 770. The effect of the gap can be reduced by using a surface permanent magnet design based on thin magnets to reduce the magnetic gap. Rare earth magnets such as Samarium-Cobalt (Sm—Co) or Neodymium-Iron-Boron (Nd—Fe—B), for example, would be useful. Another technique for reducing the effect of the air gap is to use an interior permanent magnet design with a significant reluctance component. This technique provides a method for combining high torque density and efficiency of a permanent magnet design with the radial force controllability of a synchronous reluctance machine.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

We claim:

1. A compact bearingless machine drive system comprising:

first and second rotor segments coupled to a rotor shaft;

a stator comprising a first stator segment, the first stator segment including a shared drive winding and a first separate control winding and a second stator segment including the shared drive winding and a second separate control winding;

a common end ring coupled between the first and second rotor segments;

a drive inverter for controlling the shared drive winding to generate torque to drive the bearingless machine;

first and second control inverters for respectively controlling the first and second separate control windings to generate radial forces on the first and second rotor segments to control the radial position of the first and second rotor segments with respect to the stator;

an axial bearing coupled to the rotor shaft; and an axial bearing inverter for controlling axial forces on the axial bearing.

2. The system of claim 1 further including first and second outer end rings, each attached to a respective one the first and second rotor segments.

3. The system of claim 2 wherein a thickness of the common end ring is less than a thickness of either of the first and second outer end rings.

4. The system of claim 1 further including a spacer coupled between the first and second stator segments for enhancing mechanical stiffness of the system.

5. The system of claim 4 further including a common frame enclosing the first and second rotor and stator segments.

6. The system of claim 5 wherein the spacer comprises a non-magnetic material having a similar heat coefficient of expansion as the first and second stator segments and a tensile strength at least as great as that of the first and second stator segments.

7. The system of claim 6 wherein the spacer comprises a solid material.

8. The system of claim 4 wherein the spacer comprises a material substantially identical to a material of the first and second stator segments.

9. The system of claim 8 wherein the spacer comprises a stack of laminations.

10. A bearingless machine drive system with axial control comprising:

a first rotor;

a first stator, the first stator including a first drive winding for generating torque to drive the bearingless machine and a first control winding for generating radial force to control the radial position of the first rotor with respect to the first stator;

a second rotor;

a second stator, the second stator including a second drive winding for generating torque to drive the bearingless machine and a second control winding for generating radial force to control the radial position of the second rotor with respect to the second stator;

a rotor shaft, the first and second rotors being attached to the rotor shaft, wherein the first and second rotors have respective asymmetrical orientations with respect to the first and second stators such that the rotors and stators are capable of creating a force in an axial direction when the machine is excited.

11. A compact bearingless machine drive system comprising:

first and second rotor segments;

a stator comprising a first stator segment, the first stator segment including a shared drive winding and a first separate control winding, a second stator segment, the second stator segment including the shared drive winding and a second separate control winding, and a spacer coupled between the first and second stator segments;

a rotor shaft, the first and second rotor segments being attached to the rotor shaft;

a drive inverter for controlling the shared drive winding to generate torque to drive the bearingless machine;

first and second control inverters for respectively controlling the first and second separate control windings to control the radial positions of the first and second rotor segments with respect to the stator;

an axial bearing coupled to the rotor shaft; and an axial bearing inverter for controlling axial forces on the axial bearing.

12. The system of claim 11 wherein the spacer comprises a material substantially identical to a material of the first and second stator segments.

13. The system of claim 11 wherein the spacer comprises a non-magnetic material having a similar heat coefficient of expansion as the first and second stator segments and a tensile strength at least as great as that of the first and second stator segments.

14. A compact bearingless machine drive system comprising:

a single, uniform rotor;

a stator comprising a first stator segment including a shared drive winding and a first separate control winding, a second stator segment including the shared drive winding and a second separate control winding, and a spacer coupled between the first and second stator segments;

a rotor shaft, the rotor being attached to the rotor shaft;

a drive inverter for controlling the shared drive winding to generate torque to drive the bearingless machine;

first and second control inverters for respectively controlling the first and second separate control windings to generate radial forces on the rotor to control the radial position of the rotor with respect to the stator;

an axial bearing coupled to the rotor shaft; and an axial bearing inverter for controlling axial forces on the axial bearing.

15. The system of claim 14 wherein the machine drive system is a permanent magnet machine drive system or a synchronous reluctance machine drive system.

16. A compact bearingless machine drive system comprising:

a rotor shaft;

first and second rotor segments coupled to the rotor shaft;

a stator comprising a first stator segment, the first stator segment including a shared drive winding and a first separate control winding and a second stator segment including the shared drive winding and a second separate control winding;

a drive inverter for controlling the shared drive winding to generate torque to drive the bearingless machine;

first and second control inverters for respectively controlling the first and second separate control windings to generate radial forces on the first and second rotor segments to control the radial position of the first and second rotor segments with respect to the first and second stator segments;

an axial bearing coupled to the rotor shaft; and an axial bearing inverter for controlling axial forces on the axial bearing.

* * * * *